May 14, 1946. G. A. TINNERMAN 2,400,270
FASTENING DEVICE
Filed Nov. 13, 1943
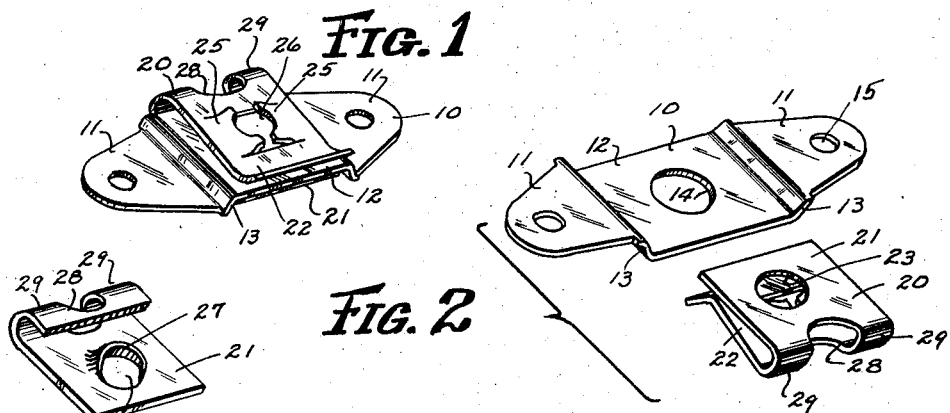
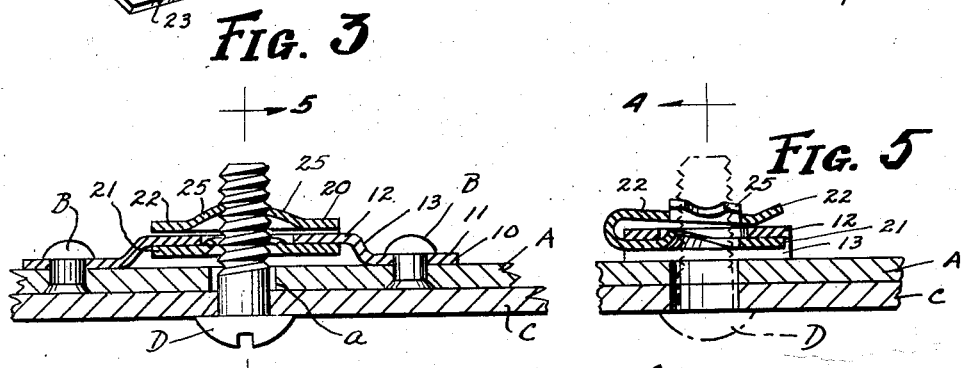
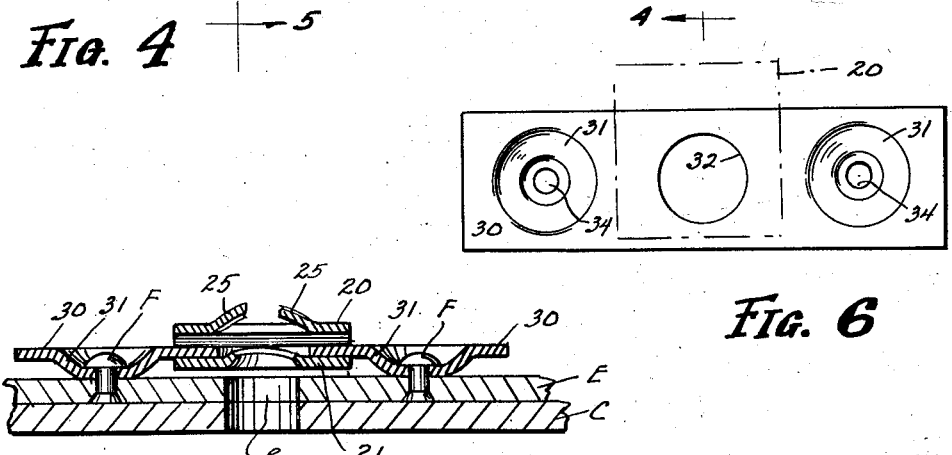
INVENTOR.
GEORGE A. TINNERMAN
BY Bates, Teare y McDean
ATTORNEYS Patented May 14, 1946

2,400,270

UNITED STATES PATENT OFFICE 2,400,270

FASTENING DEVICE

George A. Tinnerman, Cleveland, Ohio, assignor to Tinnerman Products, Inc., Cleveland, Ohio, a corporation of Ohio Application November 13, 1943, Serial No. 510,192

2 Claims. (Cl. 85—36)

This invention relates to a fastener comprising a sheet metal nut and an attaching device carrying the nut and adapted to be readily secured to a supporting member. More specifically, my invention provides an attaching strip of sheet material having an intermediate region raised above the extreme regions so that when the extreme regions are attached to a support there will be an immediate clear space between the strip and support, and I combine with this attaching strip a sheet metal nut member which is a clip doubled on itself to embrace the attaching strip at the raised region thereof and thereby provide a nut for a bolt passing through the support, attaching strip and the nut.

One of the objects of the invention is to provide such a two-piece fastener of a form which may be cheaply manufactured and readily assembled and applied and when in place will provide an effective nut. Another object is to so devise the respective parts that while the nut will hold itself in place on the carrier before the bolt is applied it has the capacity of shifting somewhat on the carrier to compensate for the inaccuracy in the alignment of the nut axis with that of the bolt hole in the support.

The above features, and others contributing to the effectiveness of the fastener, will be more apparent from the following detailed description of two embodiments of my invention illustrated in the drawing hereof.

In the drawing, Fig. 1 is a top perspective of the first embodiment of my two-part fastener in assembled position, ready for attachment; Fig. 2 is a bottom perspective of the two-parts of the fastener separated; Fig. 3 is a perspective of a portion of the nut clip looking at the top of the lower arm thereof; Fig. 4 is a longitudinal section through the attaching strip and clip mounted on a support (being a section on the line 4—4 in Fig. 5); Fig. 5 is a cross section at right angles to Fig. 4, as indicated by the line 5—5 on that figure; Fig. 6 is a plan of the second form of my carrier member; Fig. 7 is a longitudinal section of a complete device of this second embodiment attached to a support.

Referring first to Figs. 1 to 5, 10 designates the carrier strip and 20 the nut-clip. The carrier strip is formed of a flat comparatively thin piece of sheet metal having two flat portions 11 in the same plane and an intermediate flat raised portion 12 connected with the extreme portions 11 by short offsets 13. Through the center of the intermediate portion is formed a hole 14 for the passage of a bolt.

The two extreme portions 11 are shown as tapering toward the end to save material. These end portions form the means by which the clip is attached to the support. If it is to be secured by screws, bolts, or rivets, the end portions have holes 15 through them, as shown. If the device is to be welded in place these holes may be omitted.

The clip 20 is a single strip of resilient material, preferably spring steel, doubled on itself by a return bend to provide a bottom arm 21 and a top arm 22. The bottom arm has an opening 23 for the passage of the bolt and the top arm is provided with an opening and is deformed about the opening to provide a thread-engager for such bolt. As shown such deformation is made by a pair of tongues 25 partially severed from the arm 22 and bent up at acute angles and notched at their ends and warped in opposite directions to provide a helical edge about an opening 26 axially aligning with the opening 23.

When such a clip as described is shoved onto the raised region 12 of the carrier the deformed upper arm provides a nut for a bolt passing through the opening 23 in the lower arm of the clip, thence through the opening 14 of the carrier, and thence through the opening 26 in the upper arm of the clip.

To lock the nut to the carrier independently of the bolt, I provide the lower arm 21 with a raised arcuate flange 27 adjacent the opening 23, such flange being adapted to enter the opening 14 of the carrier. The raised flange 27 is preferably on that side of the opening 23 which is adjacent the fold of the clip, and the top of the flange is inclined downwardly to the top plane of the arm 21, with the result that the flange provides a ratchet tooth which may be readily shoved across the carrier but when opposite the hole 14 will spring into it as clearly indicated in Fig. 5.

It will be seen that both the carrier and the clip may be readily made out of sheet material and the clip mounted on the carrier by a simple shoving movement. For lightness, and to make a simpler operation in bending the clip into the form shown, I prefer to remove the central region at the double bend, as indicated at 28, thus providing two strap portions 29 connecting the two arms of the clip.

Figs. 4 and 5 illustrate the clip attached to a supporting plate A by rivets B. When the clip is so attached with its nut member, the supporting plate is thereby equipped with a nut ready to receive a bolt. Figs. 4 and 5 indicate at C a plate to be attached and at D a fastening bolt passing through an opening in the attached plate C and an opening in the supporting plate A and thence through the clip and carrier strip.

It will be evident that the clip may be mounted on the carrier either before or after the latter is attached as may be more convenient. While the flange 27 on the clip prevents inadvertent separation of the clip and carrier, the flange wall is spaced from the wall of the bolt opening 14 in the carrier, and this feature allows a certain amount of shifting of the clip on the carrier, the width of the clip being purposely made narrower than the length of the offset region of the carrier.

The ability of the nut to shift is a valuable feature, as it avoids the necessity for extreme accuracy in the location of the carrier with reference to the bolt opening $a$ in the supporting plate. In some types of work a large number of carriers with their nuts are employed and it is highly desirable that they be mounted in place quickly and the absence of requirement for extreme accuracy in mounting aids in this speed of installation.

In Figs. 6 and 7, I have shown the second embodiment of the invention. In this case, the clip is identical with that above described, but the carrier 30 has its offset effected by indenting or downwardly dishing the extreme regions, as indicated at 31, instead of by offsetting the whole material of the carrier. These downward bosses by engaging the supporting plate provide a raised intermediate region of the carrier about the bolt opening 32 similar to the raised region 12 in the first embodiment.

In Fig. 7, I have shown the second form of carrier attached to a supporting plate E. As shown this attachment is effected by rivets F passing through openings 34 in the carrier at the base of the downwardly formed hollow bosses.

As in the first embodiment, the carrier 30 may be readily attached to the supporting plate either before or after the clip is mounted on the carrier. When the clip is mounted it has the capacity of shifting somewhat on the carrier to avoid the necessity of extreme accuracy in the registration of the bolt openings with the nut openings, as heretofore explained.

It will be seen that with either embodiment the carrier, having its two extreme regions lower than the intermediate region, may be quickly attached in large numbers, if necessary, to their supports, and when in place effectively hold the nuts in position while allowing the slight shifting desired.

I claim:

1. The combination of a carrier comprising a strip of sheet material having a flat intermediate region and two extreme regions, wherein the entire strip is bent downwardly at the opposite ends of the intermediate region to a lower plane than the intermediate region and then bent outwardly to lie in such lower plane parallel with and offset from the intermediate region, the intermediate region having an opening through it, and a nut comprising a strip of resilient sheet material folded on itself to provide an upper arm and an under arm, the under arm being substantially narrower than the distance between the downwardly bent portions of the strip and having a bolt opening with a raised flange adjacent its opening, the flange having its external wall of less size than the wall of the opening in the carrier to enable the positioned clip to shift on the carrier, and the upper arm deformed to provide a helical edge about a bolt opening.

2. A two-part fastener comprising a single strip of sheet material having a raised intermediate region and portions at the ends of said region bent downwardly and then outwardly to provide oppositely extending flanges lying in a plane parallel with the top of said strip, a fastening clip comprising a doubled strip of resilient sheet material with one arm extending under the raised intermediate region and having an opening registering with an opening in such region and the other arm having an opening and being deformed upwardly about the opening to provide a thread-engager, the space between the plane defining the bottom surfaces of said outwardly bent portion and the underside of said intermediate region being at least as great as the thickness of the lower arm but less than the thickness of the deformed upper arm, all of said openings registering when the clip is in place on the carrier.

GEORGE A. TINNERMAN.